United States Patent
Nair (10) Patent No.: US 9,145,519 B2
(45) Date of Patent: *Sep. 29, 2015

(54) CROSSLINKABLE AROMATIC POLYESTER

(71) Applicant: Ticona LLC, Florence, KY (US)

(72) Inventor: Kamlesh P. Nair, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,570

(22) Filed: Sep. 17, 2013

(65) Prior Publication Data

US 2014/0088247 A1    Mar. 27, 2014

Related U.S. Application Data

(60) Provisional application No. 61/704,701, filed on Sep. 24, 2012, provisional application No. 61/781,297, filed on Mar. 14, 2013.

(51) Int. Cl.

| | |
|---|---|
| *C08G 69/44* | (2006.01) |
| *C08G 63/00* | (2006.01) |
| *C09K 19/38* | (2006.01) |
| *C08G 63/20* | (2006.01) |
| *C08G 63/47* | (2006.01) |
| *C08G 63/60* | (2006.01) |

(52) U.S. Cl.
CPC ............ *C09K 19/3809* (2013.01); *C08G 63/20* (2013.01); *C08G 63/47* (2013.01); *C08G 63/605* (2013.01)

(58) Field of Classification Search
None
See application file for complete search history.

(56) References Cited

U.S. PATENT DOCUMENTS

| | | | |
|---|---|---|---|
| 3,975,444 A | 8/1976 | Kovar et al. | |
| 4,161,470 A | 7/1979 | Calundann | |
| 4,513,131 A | 4/1985 | Reinhardt et al. | |
| 4,567,240 A | 1/1986 | Hergenrother et al. | |
| 4,626,584 A | 12/1986 | Stackman et al. | |
| 4,628,125 A | 12/1986 | Rogers et al. | |
| 4,654,412 A | 3/1987 | Calundann et al. | |
| 4,710,547 A | 12/1987 | Uryu et al. | |
| 4,739,030 A | 4/1988 | Lubowitz et al. | |
| 4,814,516 A | 3/1989 | Takeuchi et al. | |
| 4,851,495 A | 7/1989 | Sheppard et al. | |
| 4,961,874 A | 10/1990 | Takeuchi et al. | |
| 5,068,053 A | 11/1991 | Reiffenrath et al. | |
| 5,082,919 A | 1/1992 | Sacripante et al. | |
| 5,096,987 A | 3/1992 | Pigneri | |
| 5,114,612 A | 5/1992 | Benicewicz et al. | |
| 5,115,087 A | 5/1992 | Sheppard et al. | |
| 5,216,073 A | 6/1993 | Haider et al. | |
| 5,216,096 A | 6/1993 | Hattori et al. | |
| 5,235,025 A | 8/1993 | Casagrande et al. | |
| 5,314,640 A | 5/1994 | Yamada | |
| 5,370,819 A | 12/1994 | Fujita et al. | |
| 5,374,701 A | 12/1994 | Hay et al. | |
| 5,453,864 A | 9/1995 | Yamada et al. | |
| 5,475,133 A | 12/1995 | Douglas et al. | |
| 5,506,060 A | 4/1996 | Lubowitz et al. | |
| 5,521,014 A | 5/1996 | Lubowitz et al. | |
| 5,550,204 A | 8/1996 | Lubowitz et al. | |
| 5,575,949 A | 11/1996 | Benicewicz et al. | |
| 5,595,682 A | 1/1997 | Goodby et al. | |
| 5,616,680 A | 4/1997 | Linstid, III | |
| 5,700,393 A | 12/1997 | Kelly | |
| 5,769,393 A | 6/1998 | Kobayashi et al. | |
| 5,770,107 A | 6/1998 | Hassall et al. | |
| 5,846,451 A | 12/1998 | Nakano et al. | |
| 6,114,492 A | 9/2000 | Linstid, III et al. | |
| 6,121,495 A | 9/2000 | Babb et al. | |
| 6,149,837 A | 11/2000 | Sekine et al. | |
| 6,171,518 B1 | 1/2001 | Hikmet et al. | |
| 6,344,154 B1 | 2/2002 | Coates et al. | |
| 6,350,817 B1 | 2/2002 | Connell et al. | |
| 6,441,099 B1 | 8/2002 | Connell et al. | |
| 6,514,611 B1 | 2/2003 | Shepherd et al. | |
| 6,583,255 B1 | 6/2003 | Lubowitz et al. | |
| 6,623,810 B2 | 9/2003 | Sekine et al. | |
| 6,673,267 B2 | 1/2004 | Sekine et al. | |
| 6,849,202 B2 | 2/2005 | Sekine et al. | |
| 6,939,940 B2 | 9/2005 | Dingemans et al. | |
| 7,070,712 B2 | 7/2006 | Tang et al. | |
| 7,094,359 B2 | 8/2006 | Okamoto et al. | |
| 7,507,784 B2 | 3/2009 | Dingemans et al. | |
| 7,655,155 B2 | 2/2010 | Jung et al. | |
| 7,910,020 B2 | 3/2011 | He et al. | |
| 7,943,722 B2 | 5/2011 | Kim | |
| 7,943,856 B2 | 5/2011 | Yang et al. | |
| 8,039,576 B2 | 10/2011 | Laskoski et al. | |
| 8,101,248 B2 | 1/2012 | Yun et al. | |
| 8,105,663 B2 | 1/2012 | Lee et al. | |
| 8,178,646 B2 | 5/2012 | Kohinata et al. | |

(Continued)

FOREIGN PATENT DOCUMENTS

| | | |
|---|---|---|
| CA | 1 263 990 A | 12/1989 |
| EP | 0 890 595 B1 | 2/2000 |

(Continued)

OTHER PUBLICATIONS

Abstract of French Patent—FR2612182, Sep. 16, 1988, 1 page.

(Continued)

*Primary Examiner* — Susannah Chung
*Assistant Examiner* — Robert T Butcher
(74) *Attorney, Agent, or Firm* — Dority & Manning, P.A.

(57) ABSTRACT

A crosslinkable aromatic polyester that is formed by polymerizing certain precursor monomers in the presence of a biaromatic crosslinking agent is provided. The crosslinkable aromatic polyester can have a relatively high melting temperature. For example, the melting temperature of the crosslinkable polyester may be from about 200° C. to about 370° C. While having a relatively high melting temperature, the crosslinkable polyester can maintain a relatively low melt viscosity so that it can be readily removed from the polymerization reactor without solidifying therein.

28 Claims, 3 Drawing Sheets

(56) References Cited

U.S. PATENT DOCUMENTS

| | | |
|---|---|---|
| 8,440,313 B2 | 5/2013 | Cho et al. |
| 8,440,914 B2 | 5/2013 | Lee et al. |
| 8,492,507 B2 | 7/2013 | Rosenberg et al. |
| 8,552,123 B2 | 10/2013 | Lee et al. |
| 2006/0252906 A1 | 11/2006 | Godschalz et al. |
| 2010/0124037 A1 | 5/2010 | Jung et al. |
| 2010/0155120 A1 | 6/2010 | Lee et al. |
| 2010/0159231 A1 | 6/2010 | Cho et al. |
| 2011/0235292 A1 | 9/2011 | Jung et al. |
| 2014/0088284 A1 | 3/2014 | Nair |
| 2014/0088285 A1 | 3/2014 | Nair et al. |

FOREIGN PATENT DOCUMENTS

| | | |
|---|---|---|
| EP | 1 320 567 B1 | 12/2008 |
| EP | 2 202 221 A1 | 6/2010 |
| WO | WO 0222706 A1 | 3/2002 |
| WO | WO 2004058851 A1 | 7/2004 |
| WO | WO 2010030216 A1 | 3/2010 |

OTHER PUBLICATIONS

Abstract of Japanese Patent—JPS63284147, Nov. 21, 1988, 2 pages.
Abstract of Japanese Patent—JPH01234414, Sep. 19, 1989, 2 pages.
Abstract of Japanese Patent—JPH01308486, Dec. 13, 1989, 2 pages.
Abstract of Japanese Patent—JPH07258637, Oct. 9, 1995, 2 pages.
Abstract of Japanese Patent—JPH10101608, Apr. 21, 1998, 1 page.
Abstract of Japanese Patent—JPH2001302592, Oct. 31, 2001, 2 pages.
Abstract of Japanese Patent—JP2008222690, Sep. 25, 2008, 1 page.
Abstract of Korean Patent—KR20110078894, Jul. 7, 2011, 1 page.
Abstract of Korean Patent—KR20110082883, Jul. 20, 2011, 1 page.
Abstract of WO Patent—WO99/24529, May 20, 1999, 1 page.
Paper—Dingemans et al., "Liquid Crystal Thermosets, A New Generation of High Performance Liquid Crystal Polymers," NASA Langley Research Center, Virginia, Apr. 18, 2007, 4 pages.
Paper—Haight et al., "Liquid Crystalline Thermosets for High Temperature Adhesive Applications," Proc. $50^{th}$ Intl. SAMPE Symp. and Exhib., Long Beach, California, May 1-5, 2005, 16 pages.
Search Report and Written Opinion for PCT/US2013/060023 dated Dec. 3, 2013, 10 pages.

Thermal crosslinking of LCP thermoset (Example 1) at 380 deg. C (squares) and at 400 deg. C (Triangles). Filled symbols denote "Elastic modulus", empty symbols denote "Loss modulus"

Fig. 1

Thermal crosslinking of Example 2 at 320C (circles), 380C (squares) and 400C (Triangles). Filled symbols denote 'Elastic modulus", empty symbols denote "Loss modulus"

Fig. 2

Thermal crosslinking of LCP thermosets. Complex viscosity build-up at 400 deg. C. Example 1- broken lines, Example 2- Solid line and Example 4- squares

Fig. 3

Thermal crosslinking of LCP thermoset- Example 1 (squares), Example 4 (triangles) and LCP control example (circles) at 400 deg. C. Filled symbols denote 'Elastic modulus", empty symbols denote "Loss modulus"

Fig. 4

Thermal crosslinking of LCP thermoset- Example 4- (triangles) at 400 deg. C and (squares) at 380 deg. C. Filled symbols denote 'Elastic modulus", empty symbols denote "Loss modulus"

Fig. 5

CROSSLINKABLE AROMATIC POLYESTER

RELATED APPLICATIONS

The present application claims priority to U.S. Provisional Application Ser. Nos. 61/704,701 (filed on Sep. 24, 2012) and 61/781,297 (filed on Mar. 14, 2013), which are incorporated herein in their entirety by reference thereto.

BACKGROUND OF THE INVENTION

Thermotropic liquid crystalline polymers are classified as "rigid rod" polymers as their molecular structure is typically composed of aromatic units linked by ester groups, as well as other groups (e.g., amide groups). The rigid, rod-like structure allows the polymers to exhibit liquid crystalline behavior in their molten state (thermotropic nematic state). Due to the presence of this nematic state in the melt, these materials also exhibit unique rheological properties. One such property is a "shear thinning behavior" characterized by a decrease in complex viscosity with increasing shear rates. This high shear thinning behavior is particularly attractive in the fabrication of parts with intricate geometries (e.g., electrical connectors) because the polymers can flow well under heat and shear to uniformly fill complex parts at fast rates without excessive flashing or other detrimental processing issues. Despite these benefits, the aforementioned polymers still have various drawbacks. For example, the heat resistance of the polymer is often relatively poor as compared to other engineering thermoset materials, as evidenced by a relatively lower deflection temperature under load ("DTUL"). This can lead to inadequate mechanical properties at elevated temperatures, which is particularly problematic as the demand for heat resistance at high temperatures continually increases in molding, fiber, and film applications.

To improve heat resistance and other properties, various attempts have been made to thermally crosslink the polymer while still maintaining its liquid crystal order. In one such process, for example, a thermoset LCP polymer is produced using 4-phenylethynyl phthalic anhydride ("4-PEPA"). While this approach has some advantages, 4-PEPA is a relatively expensive crosslinking agent. Also, the incorporation of the 4-PEPA in LCP as endcaps requires a multi-step process. In the $1^{st}$ step, either monofunctional phenolic or monofunctional carboxylic acid derivatives of 4-PEPA must initially be synthesized. These monofunctional derivatives are then reacted with LCP monomers to form a low molecular weight oligomer that is functionalized by 4-PEPA end groups. In the final step, the oligomers are heated at temperatures typically ranging from 350° C. to 400° C. to induce thermal crosslinking. While the resulting thermoset resin can exhibit some improved properties, problems nevertheless remain. For instance, the oligomer that is achieved in the $2^{nd}$ step of the reaction generally has a low molecular weight and melting temperature, which can adversely impact the thermal and mechanical properties of the resulting polymer and restrict the manner in which it may be processed prior to crosslinking. Further, the use of a multi-step reaction to form the thermoset polymer can also be costly and overly complex.

As such, a need exists for an improved technique for forming thermoset liquid crystalline polymers.

SUMMARY OF THE INVENTION

In accordance with one embodiment of the present invention, a crosslinkable aromatic polyester is disclosed that is formed by polymerizing aromatic ester precursor monomers in the presence of a biaromatic alkynyl crosslinking agent having the following general formula (I):

wherein,

Ring A and B are independently a 6-membered aryl or heteroaryl optionally fused to a 6-membered aryl or heteroaryl;

$X_1$ is $Y_1R_1$;

$X_2$ is $Y_2R_2$;

$Y_1$ and $Y_2$ are independently O, C(O), OC(O), C(O)O, S, $NR_3$, C(O)$NR_3$, or $NR_3$C(O);

$R_1$, $R_2$, and $R_3$ are independently hydrogen, hydroxyl, alkyl, aryl, heteroaryl, cycloalkyl, or heterocyclyl;

$R_5$ and $R_6$ are independently alkynyl, alkyl, alkenyl, aryl, heteroaryl, cycloalkyl, heterocyclyl, halo, or haloalkyl;

a is from 1 to 5;

b is from 0 to 5;

m is from 0 to 4; and n is from 0 to 5. The melting temperature of the crosslinkable aromatic polyester is from about 200° C. to about 370° C.

In accordance with another embodiment of the present invention, a method for forming an aromatic polyester is disclosed. The method melt polymerizing a reaction mixture comprising an aromatic hydroxycarboxylic acid precursor monomer, aromatic dicarboxylic acid precursor monomer, and biaromatic alkynyl crosslinking agent, such as described herein.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3$)$_2CH$), n-butyl ($CH_3CH_2CH2CH_2$), isobutyl (($CH_3$)$_2CHCH_2$), sec-butyl (($CH_3$)($CH_3CH_2$)CH), t-butyl (($CH_3$)$_3C$), n-pentyl ($CH_3CH_2CH_2CH_2CH_2$), and neopentyl (($CH_3$)$_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and Spiro ring systems having aromatic and non-aromatic rings that have no ring heteroatoms, the term "Aryl" applies when the point of attachment is at an aromatic carbon atom (e.g., 5,6,7,8 tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and Spiro ring systems. For multiple ring systems having aromatic and non-aromatic rings that have no ring heteroatoms, the term "cycloalkyl" applies when the point of attachment is at a non-aromatic carbon atom (e.g. 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazolyl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and Spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned groups encompass unsubstituted groups, as well as groups substituted with one or more other functional groups as is known in the art. For example, an alkynyl, alkyl, alkenyl, aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester) amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, thione, phosphate, phosphonate, phosphinate, phosphonamidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents.

It is to be understood by one of ordinary skill in the art that the present discussion is a description of exemplary embodiments only, and is not intended as limiting the broader aspects of the present invention.

Generally speaking, the present invention is directed to a crosslinkable aromatic polyester that is formed by polymerizing certain aromatic ester precursor monomers in the presence of a biaromatic alkynyl crosslinking agent. By selectively controlling the particular type and concentration of precursor monomers, the particular type and concentration of the biaromatic alkynyl crosslinking agent, and reaction conditions, the present inventor has discovered that a crosslinkable aromatic polyester can be achieved that has a relatively high melting temperature. For example, the melting temperature of the crosslinkable polyester may be from about 200° C. to about 370° C., in embodiments from about 250° C. to about 350° C., in some embodiments from about 280° C. to about 350° C., in some embodiments from about 290° C. to about 335° C., and in some embodiments, from about 300° C. to about 330° C. While having a relatively high melting temperature, the crosslinkable polyester can maintain a relatively low melt viscosity. The melt viscosity of the crosslinkable aromatic polyester may, for instance, be about 150 Pa-s or less, in some embodiments about 100 Pa-s or less, in some embodiments from about 1 to about 80 Pa-s, and in some embodiments, from about 2 to about 50 Pa-s, determined at a shear rate of 1000 seconds$^{-1}$. Melt viscosity may be determined in accordance with ASTM Test No. 1238-70 at temperatures ranging from 300° C. to 350° C. depending on the melting temperature (e.g., 300° C. or 320° C.).

The crosslinkable aromatic polyester generally contains aromatic hydroxycarboxylic repeating units of Formula (III) in an amount of from about 25 mol. % to about 85 mol. %, in some embodiments from about 40 mol. % to about 80 mol. %, and in some embodiments, from about 50 mol. % to about 75 mol. %:

(III)

wherein, ring A is aryl (e.g., 1,4-phenylene or 1,3-phenylene).

The aromatic hydroxycarboxylic repeating units of Formula (III) may be derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids may include, for instance, 4-hydroxybenzoic acid ("HBA") and 2-hydroxy-6-naphthoic acid ("HNA").

The crosslinkable polyester also contains aromatic dicarboxylic acid repeating units of Formula (IV) in an amount from about 1 mol. % to about 40 mol. %, in some embodiments from about 5 mol. % to about 30 mol. %, and in some embodiments, from about 10 mol. % to about 25 mol. %:

(IV)

wherein, ring Y is aryl (e.g., 1,4-phenylene or 1,3-phenylene).

The aromatic dicarboxylic repeating units of Formula (IV) may be derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA") and isophthalic acid ("IA").

While a wide variety of aromatic ester repeating units may be employed, the polymer may nevertheless be "low naphthenic" to the extent that it contains a minimal content of repeating units derived from naphthenic hydroxycarboxylic acids and naphthenic dicarboxylic acids, such as naphthalene-2,6-dicarboxylic acid ("NDA"), 2-hydroxy-6-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than about 30 mol. %, in some embodiments no more than about 25 mol. %, in some embodiments no more than about 20 mol. %, in some embodiments no more than about 15 mol. %, and in some embodiments, from 0 mol. % to about 10 mol. % of the polymer (e.g., 0 mol. %). Despite the absence of a high level of conventional naphthenic acid repeating units, the present inventor has discovered that selective control over the type and relative concentration of the biphenyl repeating units can lead to "low naphthenic" polymers that are not only crosslinkable, but also capable of exhibiting good thermal and mechanical properties.

Of course, other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. Aromatic monofunctional carboxylic acids (e.g., benzoic acid), phenols, amines, and/or amides (e.g., acetamides) may also be employed in certain embodiments of the present invention. When employed, repeating units derived from such aromatic monofunctional compounds typically constitute from about 0.05 mol. % to about 10 mol. %, in some embodiments from about 0.1 mol. % to about 10 mol. %, and in some embodiments, from about 0.5 mol. % to about 5% of the polymer.

It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, the aromatic polyester may contain repeating units derived from 4-hydroxybenzoic acid ("HBA"), and terephthalic acid ("TA") and/or isophthalic acid ("IA") or phthalic acid, as well as various other optional constituents. The repeating units derived from 4-hydroxybenzoic acid ("HBA") may constitute from about 25 mol. % to about 85 mol. %, in some embodiments from about 40 mol. % to about 80 mol. %, and in some embodiments, from about 50 mol. % to about 75% of the polymer. The repeating units derived from terephthalic acid ("TA") and/or isophthalic acid ("IA") may likewise constitute from about 1 mol. % to about 40 mol. %, in some embodiments from about 5 mol. % to about 30 mol. %, and in some embodiments, from about 10 mol. % to about 25 mol. % of the polymer. Other possible repeating units may include those derived from 4,4'-biphenol ("BP"), hydroquinone ("HQ"), and/or acetaminophen ("APAP"). In certain embodiments, for example, repeating units derived from BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain a relatively low amount of repeating units derived from naphthenic monomers (6-hydroxy-2-naphthoic acid ("HNA") or 2,6-naphthalenedicarboxylic acid ("NDA") within the ranges noted above.

As indicated above, the precursor monomers used to form the crosslinkable polyester are polymerized in the presence of a biaromatic alkynyl crosslinking agent. The biaromatic alkynyl crosslinking agent of the present invention has the following general formula (I):

wherein,

Ring A and B are independently a 6-membered aryl or heteroaryl optionally fused to a 6-membered aryl or heteroaryl;

$X_1$ is $Y_1R_1$;

$X_2$ is $Y_2R_2$;

$Y_1$ and $Y_2$ are independently O, C(O), OC(O), C(O)O, S, $NR_3$, $C(O)NR_3$, or $NR_3C(O)$;

$R_1$, $R_2$, and $R_3$ are independently hydrogen, hydroxyl, alkyl, aryl, heteroaryl, cycloalkyl, or heterocyclyl;

$R_5$ and $R_6$ are independently alkynyl, alkyl, alkenyl, aryl, heteroaryl, cycloalkyl, heterocyclyl, halo, or haloalkyl;

a is from 1 to 5, in some embodiments from 1 to 3, and in some embodiments, from 1 to 2 (e.g., 1);

b is from 0 to 5, in some embodiments from about 0 to 3, and in some embodiments, from 0 to 2 (e.g., 0);

m is from 0 to 4, in some embodiments from about 0 to 3, and in some embodiments, from 0 to 2 (e.g., 0); and n is from 0 to 5, in some embodiments from about 0 to 3, and in some embodiments, from 0 to 2 (e.g., 0).

As indicated, the ethynyl functional group may be located at a variety of positions of the Rings A and B, such as at the 4 position (para position), 3 position (meta position), or 2 position (ortho position). In particular embodiments, however, the ethynyl functional group is located at the 4 position, such as depicted below in general formula (II). In certain embodiments, Ring A and B may also be a 6-membered aryl, such as benzene; 6-membered heteroaryl, such as pyridine, pyrazine, pyrimidine, pyridazine, etc.; 6-membered aryl fused to a 6-memebered aryl, such as naphthalene; 6-membered aryl fused to a 6-membered heteroaryl, such as quinoline, isoquinoline, quinoxaline, quinazoline, cinnoline, etc.; as well as combinations thereof. As indicated above, Rings A and B may be unsubstituted (m and/or n is 0) or substituted (m and/or n is 1 or more). In particular embodiments, however, m and n are 0 such that the biaromatic alkynyl crosslinking agent is provided by general formula (II):

$Y_1$ and/or $Y_2$ in Formula I or II may be O, OC(O), C(O)O, NH, C(O)NH, or NHC(O), and $R_1$ and/or $R_2$ may be H, OH, or alkyl (e.g., methyl). For example, $Y_1R$, and/or $Y_2R_2$ may be OH, O-alkyl (e.g., $OCH_3$), OC(O)-alkyl (e.g., $OC(O)CH_3$), C(O)OH, C(O)O-alkyl (e.g., $C(O)OCH_3$), OC(O)OH, OC(O)O-alkyl (e.g., $OC(O)OCH_3$), $NH_2$, NH-alkyl (e.g., $NHCH_3$), $C(O)NH_2$, C(O)NH-alkyl (e.g., $C(O)NHCH_3$), NHC(O)H, NHC(O)-alkyl (e.g., $NHC(O)CH_3$), NHC(O)OH, NHC(O)O-alkyl (e.g., $NHC(O)OCH_3$), etc. Further, in certain embodiments, as in Formula (I) and (II) may be equal to 1, and b may be equal to 0. Desirably, Rings A and B may also be phenyl so that the resulting compounds are considered biphenyl alkynyl crosslinking agents. Specific embodiments of suitable biphenyl alkynyl crosslinking agents may include, for instance, 4-phenylethynyl acetanilide (a is 1, $Y_1$ is NHC(O), and $R_1$ is $CH_3$); 4-phenylethynyl benzoic acid (b is 0, a is 1, $Y_1$ is C(O)O, $R_1$ is H); methyl 4-phenylethynyl benzoate (b is 0, a is 1, $Y_1$ is C(O)O, $R_1$ is $CH_3$); 4-phenylethynyl phenyl acetate (b is 0, a is 1, $Y_1$ is OC(O), and $R_1$ is $CH_3$); 4-phenylethynyl benzamide (b is 0, a is 1, $Y_1$ is $C(O)NR_3$, $R_1$ is H, $R_3$ is H); 4-phenylethynyl aniline (b is 0, a is 1, $Y_1$ is $NR_3$, $R_1$ is H, and $R_3$ is H); N-methyl-4-phenylethynyl aniline (b is 0, a is 1, $Y_1$ is $NR_3$, $R_1$ is H, and $R_3$ is $CH_3$); 4-phenylethynyl phenyl carbamic acid (b is 0, a is 1, $Y_1$ is $NR_3C(O)$, $R_1$ is OH, and $R_3$ is H); 4-phenylethynyl phenol (b is 0, a is 1, $Y_1$ is O, and $R_1$ is H); 3-phenylethynyl benzoic acid (b is 0, a is 1, $Y_1$ is C(O)O, $R_1$ is H); 3-phenylethynyl aniline (b is 0, a is 1, $Y_1$ is $NR_3$, $R_1$ is H, and $R_3$ is H); 3-phenylethynyl phenyl acetate (b is 0, a is 1, $Y_1$ is OC(O), and $R_1$ is $CH_3$); 3-phenylethynyl phenol (b is 0, a is 1, $Y_1$ is O, and $R_1$ is H); 3-phenylethynyl acetanilide (a is 1, $Y_1$ is NHC(O), and $R_1$ is $CH_3$); 4-carboxyphenylethynyl benzoic acid (a and b are 1, $Y_1$ and $Y_2$ are C(O)O, and $R_1$ and $R_2$ are H); 4-aminophenylethynyl aniline (a and b are 1, $Y_1$ and $Y_2$ are $NR_3$, and $R_1$, $R_2$ and $R_3$ are H); and so forth. Particularly suitable are 4-phenylethynyl benzoic acid, 4-phenylethynyl aniline, 4-phenylethynyl phenyl acetate, 4-phenylethynyl acetanilide, and 4-phenylethynyl phenol.

The crosslinking agent has a relatively low molecular weight so that it does not adversely impact the melt rheology of the resulting polymer. For example, the alkynyl crosslinking agent typically has a molecular weight of about 1,000 grams per mole or less, in some embodiments from about 20 to about 500 grams per mole, in some embodiments from about 30 to about 400 grams per mole, and in some embodiments, from about 50 to about 300 grams per mole. In addition to possessing a relatively low molecular weight, the alkynyl crosslinking agent also generally possesses a high alkynyl functionality. The degree of alkynyl functionality for a given molecule may be characterized by its "alkynyl equivalent weight", which reflects the amount of a compound that contains one molecule of an alkynyl functional group and may be calculated by dividing the molecular weight of the compound by the number of alkynyl functional groups in the molecule. For example, the crosslinking agent may contain from 1 to 6, in some embodiments from 1 to 4, and in some embodiments, from 1 to 2 alkynyl functional groups per molecule (e.g., 1). The alkynyl equivalent weight may likewise be from about 10 to about 1,000 grams per mole, in some embodiments from about 20 to about 500 grams per mole, in some embodiments from about 30 to about 400 grams per mole, and in some embodiments, from about 50 to about 300 grams per mole. In one embodiment, the alkynyl crosslinking agent is a mono-functional compound in that Rings A and B are directly bonded to only one alkynyl group. In such embodiments, m in Formula (I) may be 0.

If desired, it should be understood that multiple biaromatic alkynyl crosslinking agents may also be employed in the present invention. The use of different biaromatic alkynyl crosslinking agents can, for instance, facilitate the formation of higher molecular weight polymers by helping to balance the stoichiometry and achieve a balanced reaction. For example, one crosslinking agent may be employed that is a carboxylic acid (e.g., $Y_1$ is C(O)O and $R_1$ is H) and another crosslinking agent may be employed that is a phenol (e.g., $Y_1$ is O and $R_1$ is H), amine (e.g., $Y_1$ is NH and $R_1$ is H), amide (e.g., $Y_1$ is C(O)NH and $R_1$ is H), acetate (e.g., $Y_1$ is C(O)O and $R_1$ is $CH_3$), etc., as well as combinations of the foregoing. If desired, other types of crosslinking agents may also be employed in combination with the biaromatic alkynyl crosslinking agent. For example, in certain embodiments, a monoaromatic alkynyl crosslinking agent may be employed, such as 3-phenylprop-2-ynoic acid (or phenyl propiolic acid), methyl-3-phenylprop-2-ynoate, 4-phenylbut-3-ynoic acid, 5-phenylpent-2-en-4-ynoic acid, 3-phenylprop-2-ynamide, etc.

The crosslinkable aromatic polyester may generally be prepared by introducing the precursor monomers used to form the backbone of the polymer (e.g., aromatic hydroxycarboxylic acid, aromatic dicarboxylic acid, aromatic diol, aromatic amide, aromatic amine, etc.) into a reactor vessel to initiate a polycondensation reaction. The particular conditions and steps employed in such reactions may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the polymerization reaction may proceed through the acetylation of the monomers as known in art. Acetylation may occur in in a separate reactor vessel, or it may occur in situ within the polymerization reactor vessel. When separate reactor vessels are employed, one or more of the monomers may be introduced to the acetylation reactor and subsequently transferred to the melt polymerization reactor. Likewise, one or more of the monomers may also be directly introduced to the reactor vessel without undergoing pre-acetylation. Acetylation may be accomplished by adding an acetylating agent (e.g., acetic anhydride) to one or more of the monomers. One particularly suitable technique for acetylating monomers may include, for instance, charging precursor monomers (e.g., 4-hydroxybenzoic acid and 2,6-hydroxynaphthoic acid) and acetic anhydride into a reactor and heating the mixture to acetylize a hydroxyl group of the monomers (e.g., forming acetoxy).

Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

After any optional acetylation is complete, the resulting composition may be melt-polymerized. Although not required, this is typically accomplished by transferring the acetylated monomer(s) to a separator reactor vessel for conducting a polycondensation reaction. If desired, one or more of the precursor monomers used to form the aromatic polyester may be directly introduced to the melt polymerization reactor vessel without undergoing pre-acetylation. Other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. The catalyst is typically added to the acetylation reactor rather than the polymerization reactor, although this is by no means a requirement.

In some embodiments, the melt polymerized polymer may also be subjected to a subsequent solid-state polymerization method to further increase its molecular weight. For instance, solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 300° C. The polymerization time will of course vary based on the temperature and target molecular weight. In most cases, however, the solid-state polymerization time will be from about 2 to about 12 hours, and in some embodiments, from about 4 to about 10 hours.

Regardless of the particular method employed, the biaromatic alkynyl crosslinking agent may be supplied at any stage of the polymerization process, such as to the acetylation reactor vessel, melt polymerization reactor vessel, solid state polymerization reactor vessel, etc., as well as combinations of the foregoing. Although it may be introduced at any stage, it is typically desired to supply the alkynyl crosslinking agent before and/or during melt polymerization so that it forms a reaction mixture with the precursor monomers. The relative amount of the biaromatic alkynyl crosslinking agent in the reaction mixture may be from about 0.1 to about 10 parts, in some embodiments from about 0.5 to about 8 parts, and in some embodiments, from about 1 to about 5 parts by weight relative to 100 parts by weight of the reaction mixture. Biaromatic alkynyl crosslinking agents may, for example, constitute from about 0.1 wt. % to about 10 wt. %, in some embodiments from about 0.5 wt. % to about 8 wt. %, and in some embodiments, from about 1 wt. % to about 5 wt. % of the reaction mixture. Precursor monomers may likewise constitute from about 90 wt. % to about 99.9 wt. %, in some embodiments from about 92 wt. % to about 99.5 wt. %, and in some embodiments, from about 95 wt. % to about 99 wt. % of the reaction mixture. For example, aromatic hydroxycarboxylic acid precursor monomers (e.g., acetylated or non-acetylated HBA, acetylated or non-acetylated HNA, etc.) may constitute from about 25 wt. % to about 85 wt. %, in some embodiments from about 40 wt. % to about 80 wt. %, and in some embodiments, from about 50 wt. % to about 75 wt. % of the reaction mixture. Aromatic dicarboxylic acid precursor monomers (e.g., TA, IA, etc.) may also constitute from about 1 wt. % to about 40 wt. %, in some embodiments from about 5 wt. % to about 30 wt. %, and in some embodiments, from about 10 wt. % to about 25 wt. % of the reaction mixture. While referred to in terms of the reaction mixture, it should also be understood that the ratios and weight percentages may also be applicable to the final polymer. That is, the parts by weight of the alkynyl crosslinking agent relative to 100 parts by weight of the crosslinkable aromatic polyester and the percentage of the alkynyl crosslinking agents in the final polymer may be within the ranges noted above.

The particular conditions and steps employed during the melt-polymerization reaction may be selectively controlled to achieve the desired degree of polymerization without inducing thermal crosslinking. This may be accomplished, for example, by melt polymerizing the reaction mixture at a temperature of from about 250° C. to about 350° C., in some embodiments from about 280° C. to about 350° C., in some embodiments from about 290° C. to about 335° C., and in some embodiments, from about 300° C. to about 330° C. If desired, the polymer may thereafter be subjected to solid-state polymerization, such as described above, to further increase its molecular weight.

One particularly suitable technique for forming the crosslinkable aromatic polyester includes charging precursor monomers (e.g., aromatic hydroxycarboxylic acid, aromatic dicarboxylic acid, aromatic diol, aromatic amide, aromatic amine, etc.), biaromatic alkynyl crosslinking agent, and an acetylating agent (e.g., acetic anhydride) into a reactor, heating the mixture to a temperature (e.g., from about 90° C. to about 150° C.) to acetylize a hydroxyl group of the monomers (e.g., forming acetoxy), and then heating the mixture to an elevated temperature of from about 250° C. to about 350° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi. Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried.

Although not necessarily a requirement, the resulting crosslinkable aromatic polyester is generally classified as a "thermotropic liquid crystalline" polymer to the extent that it can possess a rod-like structure and exhibit a liquid crystalline behavior in its molten state (e.g., thermotropic nematic state). The polymer may possess a fully crystalline, semi-crystalline, or amorphous-like structure under certain circumstances. The intrinsic viscosity of the polymer, which is generally proportional to molecular weight, may be relatively high. For example, the intrinsic viscosity may be about 2 deciliters per gram ("dL/g") or more, in some embodiments about 3 dL/g or more, in some embodiments from about 5 to about 20 dL/g, and in some embodiments from about 6 to about 15 dL/g. Intrinsic viscosity may be determined in accordance with ISO-1628-5 using a 50/50 (v/v) mixture of pentafluorophenol and hexafluoroisopropanol, as described in more detail below. The crystallization temperature of the polyester may likewise range from about 250° C. to about 330° C., in some embodiments from about 260° C. to about 320° C., and in some embodiments, from about 280° C. to about 310° C.

Once the crosslinkable polyester is formed, it may be thermally crosslinked when desired. Thermal crosslinking typically occurs at temperatures of about 380° C. or more, in some embodiments about 390° C. or more, and in some embodiments, 400° C. to about 450° C. Although not always the case, a small portion of the alkynyl crosslinking agent may also remain unreacted and within the polymer composition after crosslinking. For example, in certain embodiments, the crosslinking agent may constitute from about 0.001 wt. % to about 2 wt. %, and in some embodiments, from about 0.01 wt. % to about 1 wt. %, and in some embodiments, from about 0.05 wt. % to about 0.5 wt. % of the polymer composition.

If desired, a neat aromatic polyester may be thermally crosslinked, or the polyester may first be blended with one or more additives to form a polymer composition, which is then subjected to thermal crosslinking. Examples of suitable additives may include, for instance, antimicrobials, pigments, antioxidants, stabilizers, surfactants, waxes, flow promoters, solid solvents, fillers, and other materials added to enhance properties and processibility. For example, a filler material may be incorporated with the polymer composition to enhance strength. A filler composition can include a filler material such as a fibrous filler and/or a mineral filler and optionally one or more additional additives as are generally known in the art. Mineral fillers may, for instance, be employed in the polymer composition to help achieve the desired mechanical properties and/or appearance. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4P_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable fillers may include calcium silicate, aluminum silicate, mica, diatomaceous earth, wollastonite, alumina, silica, titanium dioxide, calcium carbonate, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof.

Fibers may also be employed as a filler material to further improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulating property, which is often desirable for use in electronic components, the high strength fibers may be formed from materials that are also generally insulating in nature, such as glass, ceramics (e.g., alumina or silica), aramids (e.g., Kevlar® marketed by E. I. du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. When employed, fibrous fillers typically constitute from about 5 wt. % to about 60 wt. %, in some embodiments from about 10 wt. % to about 55 wt. %, and in some embodiments, from about 20 wt. % to about 50 wt. % of the polymer composition.

The materials used to form the polymer composition may be combined together using any of a variety of different techniques as is known in the art. In one particular embodiment, for example, the polymer and other optional additives are melt processed as a mixture within an extruder to form the polymer composition. The mixture may be melt-kneaded in a single-screw or multi-screw extruder at a temperature of from about 280° C. to about 350° C. In one embodiment, the mixture may be melt processed in an extruder that includes multiple temperature zones. The temperature of individual zones is typically set within about −60° C. to about 25° C. relative to the melting temperature of the polymer. By way of example, the mixture may be melt processed using a twin screw extruder such as a Leistritz 18-mm co-rotating fully intermeshing twin screw extruder. A general purpose screw design can be used to melt process the mixture. In one embodiment, the mixture including all of the components may be fed to the feed throat in the first barrel by means of a volumetric feeder. In another embodiment, different components may be added at different addition points in the extruder, as is known. For example, the polymer may be applied at the feed throat and optional additives may be supplied at the same or different temperature zone located downstream therefrom. Regardless, the resulting mixture can be melted and mixed then extruded through a die. The extruded polymer composition can then be quenched in a water bath to solidify and granulated in a pelletizer followed by drying. If desired, the polymer composition may also be ground into a powder for use in various applications.

The crosslinkable aromatic polyester of the present invention may generally be employed in a wide variety of possible applications and processes. For example, the polymer is amenable to shape forming and blending techniques, such as film extrusion, fiber spinning, compression molding, injection molding, resin transfer molding, resin film injection, powder molding, pultrusion, blow molding, coating, thermoforming, etc. In certain embodiments, for example, the polyester may be coated onto a substrate to form a laminate. The material and size of the substrate to which the polyester is applied may generally vary depending on the intended application. For example, the substrate may be formed from a metal (e.g., copper), plastic, ceramic, etc. Likewise, in certain embodiments, the substrate may have a foil-like structure in that it is relatively thin, such as having a thickness of about 500 micrometers or less, in some embodiments about 200 micrometers or less, and in some embodiments, from about 1 to about 100 micrometers. Of course, higher thicknesses may also be employed. In some cases, the aromatic polyester may be crosslinked before being applied to the substrate. Alternatively, the polyester may be applied to the substrate and thereafter crosslinked to form a thermoset aromatic polyester.

The aromatic polyester may also be formed into a variety of other types of articles. For example, the polyester may be employed in a composite in which the polymer is coated or impregnated within a fibrous material, such as woven fabric, nonwoven fabric, fibers, such as glass, silica glass, carbon, alumina, silicon carbide, polyamide, polyimide, polyester fibers, etc. If desired, the crosslinkable polymer may initially be impregnated with the fibers and thereafter heated to an elevated temperature to form a thermally crosslinked polyester matrix. In certain embodiments, such composites may be employed as a supporting material in a flexible printed circuit board. If desired, a conductive layer (e.g., copper foil) may also be laminated to the composite.

The present invention may be better understood with reference to the following examples.

Test Methods

Melt Viscosity:

The melt viscosity (Pa-s) may be determined in accordance with ISO Test No. 11443 at temperatures between 300° C. to 350° C. (e.g., 300° C. or 320° C.) at a shear rate of 400 s$^{-1}$ and 1000 s$^{-1}$ using a Dynisco 7001 capillary rheometer. The rheometer orifice (die) may have a diameter of 1 mm, length of 20 mmw, L/D ratio of 20.1, and an entrance angle of 180°. The diameter of the barrel was 9.55 mm±0.005 mm and the length of the rod may be 233.4 mm.

Complex Viscosity:

The complex viscosity is used herein as an estimate for the degree of crosslinking of the polymer. Complex viscosity is a frequency-dependent viscosity, and may be determined during forced harmonic oscillation of shear stress at angular frequencies of 0.1 radians per second. Measurements may be determined at a constant temperature of 350° C., 380° C., or 400° C. and at a constant strain amplitude of 1% using an ARES-G2 rheometer (TA Instruments) with a parallel plate configuration (25 mm plate diameter).

Intrinsic Viscosity:

The intrinsic viscosity ("IV") may be measured in accordance with ISO-1628-5 using a 50/50 (v/v) mixture of pentafluorophenol and hexafluoroisopropanol. Each sample was prepared in duplicate by weighing about 0.02 grams into a 22 mL vial. 10 mL of pentafluorophenol ("PFP") was added to each vial and the solvent. The vials may be placed in a heating block set to 80° C. overnight. The following day 10 mL of hexafluoroisopropanol ("HFIP") may be added to each vial. The final polymer concentration of each sample may be about 0.1%. The samples may be allowed to cool to room temperature and analyzed using a PolyVisc automatic viscometer.

Melting and Crystallization Temperatures:

The melting temperature ("Tm") and crystallization temperature ("Tc") may be determined by differential scanning calorimetry ("DSC") as is known in the art. The melting temperature is the differential scanning calorimetry (DSC) peak melt temperature as determined by ISO Test No. 11357. The crystallization temperature is determined from the cooling exotherm in the cooling cycle. Under the DSC procedure, samples may be heated and cooled at 20° C. per minute as stated in ISO Standard 10350 using DSC measurements conducted on a TA Q2000 Instrument.

Synthesis of 4-phenylethynyl phenyl acetate (Compound A) and 4-phenylethynyl phenol (Compound B)

The synthesis of Compounds A and B may be performed as follows:

Compound A    Compound B

More particularly, 4-bromophenol (300 g) is initially added to a three-necked 1 L flask that is fitted with a reflux condenser, nitrogen blanket, and an overhead mechanical stirrer. Acetic anhydride (354 g) is added to the flask. The flask is heated at 140° C. for four (4) hours under a nitrogen atmosphere. The reaction mixture is then cooled and 1 L of distilled water is added. The mixture is extracted with (3×500 mL) of methylene chloride. The organic extracts are combined, dried with magnesium sulfate, and then concentrated to give 4-bromophenylacetate as a pale yellow liquid. Once formed, the 4-bromophenylacetate (85 g) is added in combination with phenyl acetylene ("Ph-CH") (52 g) and triphenyl phosphine ("PPH$_3$") (963 mg) to a three-necked 1 L flask, which fitted with a reflux condenser, nitrogen blanket, and an overhead mechanical stirrer. Bis(triphenylphosphine)-palladium(II)dichloride ("Pd(PPH$_3$)2Cl$_2$]") (470 mg) and CuI (190 mg) are then added with 500 mL of triethylamine ("Et$_3$N"). The flask is heated at 80° C. for sixteen (16) hours under a nitrogen atmosphere. Afterwards, the reaction mixture is cooled, and filtered to remove the salts formed and the solvent is evaporated to yield a brown oil that slowly crystallizes to give a yellow solid of 4-phenylethynyl phenyl acetate. Further purification, typically involves repeated re-crystallization from hexanes to give the final product as a pale yellow colored solid.

Synthesis of 4-phenylethynyl benzoic acid (Compound C)

The synthesis of Compound C may be performed as follows:

Compound C

More particularly, 4-bromobenzoic acid (100 g) is added to a three-necked 1 L flask, which is fitted with a reflux condenser, nitrogen blanket, and an overhead mechanical stirrer. Anhydrous methanol ("MeOH") (500 mL) is added to the flask. Concentrated sulfuric acid ("H$_2$SO$_4$") (15-20 mL) was carefully added dropwise to the mixture. The flask is heated at 80° C. for four (4) hours under a nitrogen atmosphere. The reaction mixture is then cooled and 1 L of distilled water is added. The precipitated product is filtered and washed with a saturated solution of sodium bicarbonate, washed with water, and then dried to obtain 4-bromomethylbenzoate as a white crystalline product. Once formed, the 4-bromomethylbenzoate (83.86 g) is added in combination with phenyl acetylene ("Ph-CH") (52 g) and triphenyl phosphine ("PPH$_3$") (963 mg) to a three-necked 1 L flask, which fitted with a reflux condenser, nitrogen blanket, and an overhead mechanical stirrer.

Bis(triphenylphosphine)-palladium(II)dichloride ("Pd (PPH$_3$)2Cl$_2$]") (470 mg) and CuI (190 mg) are then added with 500 mL of triethylamine ("Et$_3$N"). The flask is heated at 80° C. for sixteen (16) hours under a nitrogen atmosphere. Afterwards, the reaction mixture is cooled and the solvent is evaporated to yield a brown oil that slowly crystallizes to give a yellow solid of 4-phenylethynyl methylbenzoate (60.8 g). The resulting 4-phenylethynyl methylbenzoate (95 g) is added in combination with sodium hydroxide ("NaOH") (17.7 g) and ethanol ("EtOH") (500 mL) to a three-necked 1 L flask, which is fitted with a reflux condenser and an overhead mechanical stirrer. The flask is heated at 80° C. for four (4) hours and then allowed to cool to room temperature. After cooling, the reaction mixture is then acidifed with acetic acid until the pH is around 4 to yield a product that is then washed with water, filtered, and dried to yield 4-phenylethynyl benzoic acid ("Compound C") as a white solid.

Synthesis of 4-phenylethynyl acetanilide (Compound D)

The synthesis of Compound D may be performed as follows:

Compound D

More particularly, 4-bromoacetanilide (83.48 g), phenyl acetylene (52 g), and triphenyl phosphine (963 mg) are added to a three-necked 1 L flask, which is fitted with a reflux condenser, nitrogen blanket, and an overhead mechanical stirrer. Bis(triphenylphosphine)-palladium(II)dichloride ("Pd(PPH$_3$)$_2$Cl$_2$]") (470 mg) and CuI (190 mg) are then added with 500 mL of triethylamine ("Et3N"). The flask is heated at 80° C. for sixteen (16) hours under a nitrogen atmosphere. Afterwards, the reaction mixture is cooled and the solvent is evaporated to yield 4-phenylethynyl acetanilide ("Compound D") as a yellowish solid. Further purification can be achieved by washing with hot water (to remove the salts and traces of triethylamine), drying and re-crystallization from a suitable solvent such as hexanes.

Synthesis of 4-phenylethynyl aniline (Compound E)

The synthesis of Compound E may be performed as follows:

Compound E

More particularly, 4-iodoaniline (17.38 g), phenyl acetylene (10.4 g), and triphenyl phosphine (193 mg) are added to a three-necked 500 mL flask, which is fitted with a reflux condenser, nitrogen blanket, and an overhead mechanical stirrer. Bis(triphenylphosphine)-palladium(II)dichloride ("Pd[(PPH$_3$)$_2$Cl$_2$]") (94 mg) and CuI (38 mg) are then added with 100 mL of triethylamine ("Et$_3$N"). The flask is maintained at room temperature overnight under a nitrogen atmosphere. Afterwards, the reaction mixture is cooled and filtered to remove the precipitate. The precipitate is washed with methylene chloride and the soluble portions are recombined with the filtrate. The solvent is then evaporated to yield 4-phenylethynyl aniline ("Compound E") as a yellowish solid. Further purification, typically involves repeated re-crystallization from hexanes to give the final product as a pale yellow colored solid.

Comparative Example

A 2 L flask is charged with 4-hydroxybenzoic acid ("HBA") (432.3 g), 2-hydroxy-6-naphthoic acid ("HNA") (47 g), terephthalic acid ("TA") (134.6 g), 4,4'-biphenol ("BP") (104.3 g), acetaminophen ("APAP") (37.8 g), benzoic acid (18.3 g), 4-phenylphenol (25.5 g), and 33 mg of potassium acetate. The flask next is equipped with a C-shaped stirrer, a thermal couple, a gas inlet, and distillation head. The flask is placed under a low nitrogen purge and acetic anhydride (99.7% assay, 502 g) is added. The milky-white slurry is agitated at 75 rpm and heated to 140° C. over the course of 95 minutes using a fluidized sand bath. After this time, the mixture is gradually heated to 335° C. steadily over 350 minutes. Reflux is seen once the reaction exceeds 140° C. and the overhead temperature is increased to approximately 115° C. as acetic acid byproduct is removed from the system. During the heating, the mixture grows yellow and slightly more viscous, and the vapor temperature gradually drops to 90° C. Once the mixture has reached 335° C., the nitrogen flow is stopped. The flask is evacuated below 20 psi and the agitation is slowed to 30 rpm over the course of 45 minutes. As the time under vacuum progresses, the mixture grows viscous. After 30 minutes, in the final vacuum step, no torque is recorded as seen by the strain on the agitator motor. The reaction is then stopped by releasing the vacuum and stopping the heat flow to the reactor. The flask is cooled and the polymer is recovered as a solid, dense yellow-brown plug.

A sample is obtained for analytical testing by mechanical size reduction. The melting temperature is 300° C., the crystallization temperature is 276° C., the melt viscosity at 1000 s$^{-1}$ and 300° C. is 17.1 Pa-s, and the melt viscosity at 400 s$^{-1}$ and 300° C. is 36.4 Pa-s.

Example 1

A 2 L flask is charged with 4-hydroxybenzoic acid ("HBA") (432.3 g), 2-hydroxy-6-naphthoic acid ("HNA") (47 g), terephthalic acid ("TA") (134.6 g), 4,4'-biphenol ("BP") (104.3 g), acetaminophen ("APAP") (37.8 g), benzoic acid (18.3 g), Compound A (25.5 g), and 33 mg of potassium acetate. The flask next is equipped with a C-shaped stirrer, a thermal couple, a gas inlet, and distillation head. The flask is placed under a low nitrogen purge and acetic anhydride (99.7% assay, 502 g) is added. The milky-white slurry is agitated at 75 rpm and heated to 140° C. over the course of 95 minutes using a fluidized sand bath. After this time, the mixture is gradually heated to 335° C. steadily over 350 minutes. Reflux is seen once the reaction exceeds 140° C. and the overhead temperature is increased to approximately 115° C. as acetic acid byproduct is removed from the system. During the heating, the mixture grows yellow and slightly more viscous, and the vapor temperature gradually drops to 90° C. Once the mixture has reached 320° C., the nitrogen flow is stopped. The flask is evacuated below 20 psi and the agitation is slowed to 30 rpm over the course of 45 minutes. As the time under vacuum progresses, the mixture grows viscous. After 30 minutes, in the final vacuum step, no torque is recorded as seen by the strain on the agitator motor. The reaction is then stopped by releasing the vacuum and stopping the heat flow to the reactor. The flask is cooled and the polymer is recovered as a solid, dense yellow-brown plug.

A sample is obtained for analytical testing by mechanical size reduction. The melting temperature is 319° C., the crystallization temperature is 275° C., the melt viscosity at 1000 s$^{-1}$ and 300° C. is 37.3 Pa-s, and the melt viscosity at 400 s$^{-1}$ and 300° C. is 48.9 Pa-s.

Example 2

A 2 L flask is charged with 4-hydroxybenzoic acid ("HBA") (432.3 g), 2-hydroxy-6-naphthoic acid ("HNA") (47 g), terephthalic acid ("TA") (134.6 g), 4,4'-biphenol ("BP") (104.3 g), acetaminophen ("APAP") (37.8 g), benzoic acid (30.53 g), Compound A (59.06 g), 33 mg of potassium acetate, and phenyl propiolic acid (59.02 g). The flask next is equipped with a C-shaped stirrer, a thermal couple, a gas inlet, and distillation head. The flask is placed under a low nitrogen purge and acetic anhydride (99.7% assay, 497.6 g) is added. The milky-white slurry is agitated at 75 rpm and heated to 140° C. over the course of 95 minutes using a fluidized sand bath. After this time, the mixture is gradually heated to 335° C. steadily over 340 minutes. Reflux is seen once the reaction exceeds 140° C. and the overhead temperature is increased to approximately 115° C. as acetic acid byproduct is removed from the system. During the heating, the mixture grows yellow and slightly more viscous, and the vapor temperature gradually drops to 90° C. Once the mixture has reached 320° C., the nitrogen flow is stopped. The flask is evacuated below 20 psi and the agitation is slowed to 30 rpm over the course of 45 minutes. As the time under vacuum progresses, the mixture grows viscous. After 173 minutes, in the final vacuum step, no torque is recorded as seen by the strain on the agitator motor. The reaction is then stopped by releasing the vacuum and stopping the heat flow to the reactor. The flask is cooled and the polymer is recovered as a solid, dense yellow-brown plug.

A sample is obtained for analytical testing by mechanical size reduction. The melting temperature is 310° C., the crystallization temperature is 274° C., the melt viscosity at 1000 s$^{-1}$ and 300° C. is 20.0 Pa-s, and the melt viscosity at 400 s$^{-1}$ and 300° C. is 27.6 Pa-s.

Example 3

A 2 L flask is charged with 4-hydroxybenzoic acid ("HBA") (432.3 g), 2-hydroxy-6-naphthoic acid ("HNA") (47 g), terephthalic acid ("TA") (134.6 g), 4,4'-biphenol ("BP") (104.3 g), acetaminophen ("APAP") (37.8 g), Compound C (16.6 g), Compound A (17.7 g), and 33 mg of potassium acetate. The flask next is equipped with a C-shaped stirrer, a thermal couple, a gas inlet, and distillation head. The flask is placed under a low nitrogen purge and acetic anhydride (99.7% assay, 502 g) is added. The milky-white slurry is agitated at 75 rpm and heated to 140° C. over the course of 95 minutes using a fluidized sand bath. After this time, the mixture is gradually heated to 320° C. steadily over 350 minutes. Reflux is seen once the reaction exceeds 140° C. and the overhead temperature is increased to approximately 115° C. as acetic acid byproduct is removed from the system. During the heating, the mixture grows yellow and slightly more viscous, and the vapor temperature gradually drops to 90° C. Once the mixture has reached 320° C., the nitrogen flow is stopped. The flask is evacuated below 20 psi and the agitation is slowed to 30 rpm over the course of 45 minutes. As the time under vacuum progresses, the mixture grows viscous. After 30 minutes, in the final vacuum step, no torque is recorded as seen by the strain on the agitator motor. The reaction is then stopped by releasing the vacuum and stopping the heat flow to the reactor. The flask is cooled and the polymer is recovered as a solid, dense yellow-brown plug.

A sample is obtained for analytical testing by mechanical size reduction. The melting temperature is 325.5° C. and the crystallization temperature is 280° C.

Example 4

A 2 L flask is charged with 4-hydroxybenzoic acid ("HBA") (432.3 g), 2-hydroxy-6-naphthoic acid ("HNA") (47 g), terephthalic acid ("TA") (134.6 g), 4,4'-biphenol ("BP") (104.3 g), acetaminophen ("APAP") (37.8 g), Compound D (35.3 g), benzoic acid (18.31 g), and 33 mg of potassium acetate. The flask next is equipped with a C-shaped stirrer, a thermal couple, a gas inlet, and distillation head. The flask is placed under a low nitrogen purge and acetic anhydride (991% assay, 502 g) is added. The milky-white slurry is agitated at 75 rpm and heated to 140° C. over the course of 95 minutes using a fluidized sand bath. After this time, the mixture is gradually heated to 320° C. steadily over 350 minutes. Reflux is seen once the reaction exceeds 140° C. and the overhead temperature is increased to approximately 115° C. as acetic acid byproduct is removed from the system. During the heating, the mixture grows yellow and slightly more viscous, and the vapor temperature gradually drops to 90° C. Once the mixture has reached 320° C., the nitrogen flow is stopped. The flask is evacuated below 20 psi and the agitation is slowed to 30 rpm over the course of 45 minutes. As the time under vacuum progresses, the mixture grows viscous. After 30 minutes, in the final vacuum step, no torque is recorded as seen by the strain on the agitator motor. The reaction is then stopped by releasing the vacuum and stopping the heat flow to the reactor. The flask is cooled and the polymer is recovered as a solid, dense yellow-brown plug.

A sample is obtained for analytical testing by mechanical size reduction. The melting temperature is 307° C., the crystallization temperature is 274° C., the melt viscosity at 1000 s$^{-1}$ and 320° C. is 113 Pa-s, and the melt viscosity at 400 s$^{-1}$ and 320° C. is 238 Pa-s.

Example 5

Figure 1:
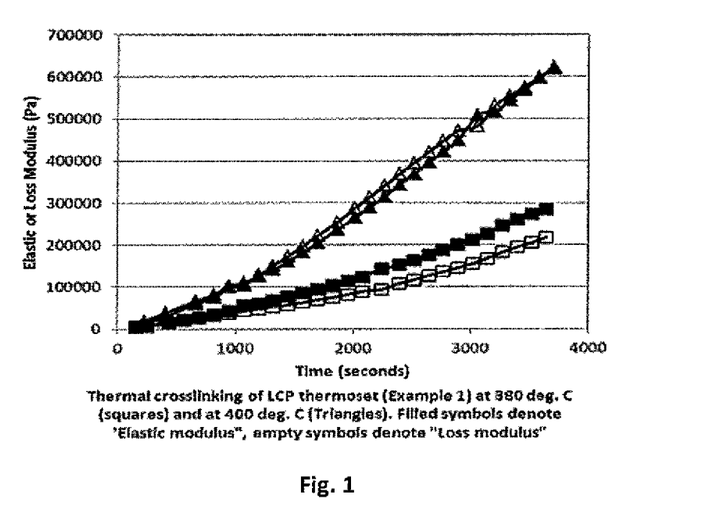
FIG. 1 is a graph showing elastic and loss modulus (Pa) versus time for Example 1 at temperatures of 380° C. and 400° C.
Figure 2:
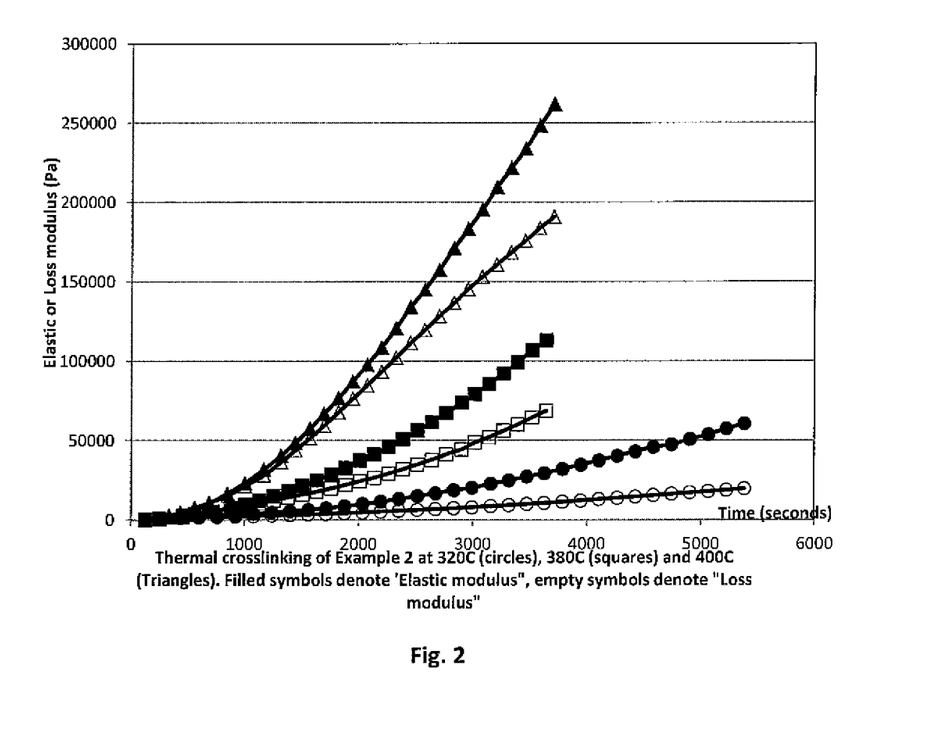
FIG. 2 is a graph showing elastic and loss modulus (Pa) versus time for Example 2 at temperatures of 320° C., 380° C., and 400° C.
Figure 3:
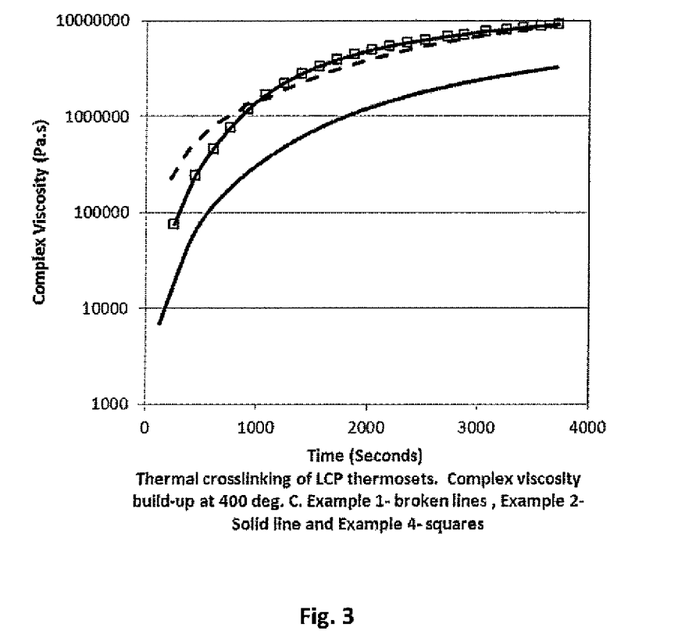
FIG. 3 is a graph showing complex viscosity (Pa·s) versus time for Examples 1-2 and 4 at a temperature of 400° C.
Figure 4:
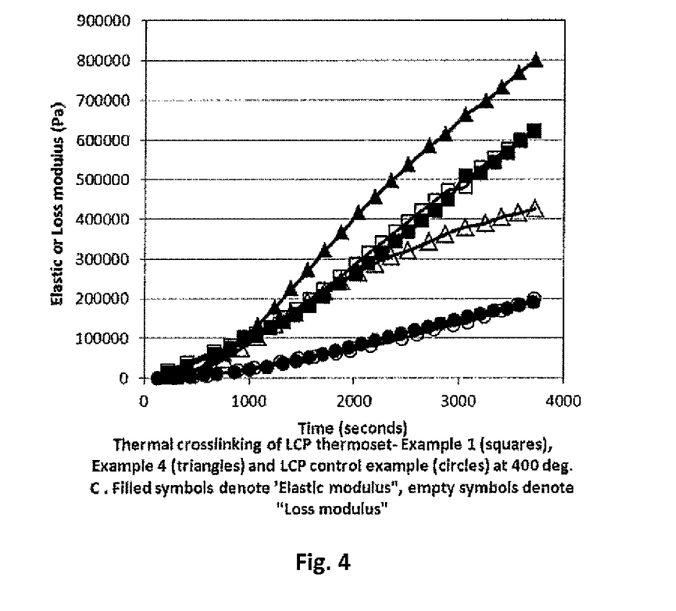
FIG. 4 is a graph showing elastic and loss modulus (Pa) versus time for Examples 1 and 4 at a temperature of 400° C. in comparison to the Comparative Example.
Figure 5:
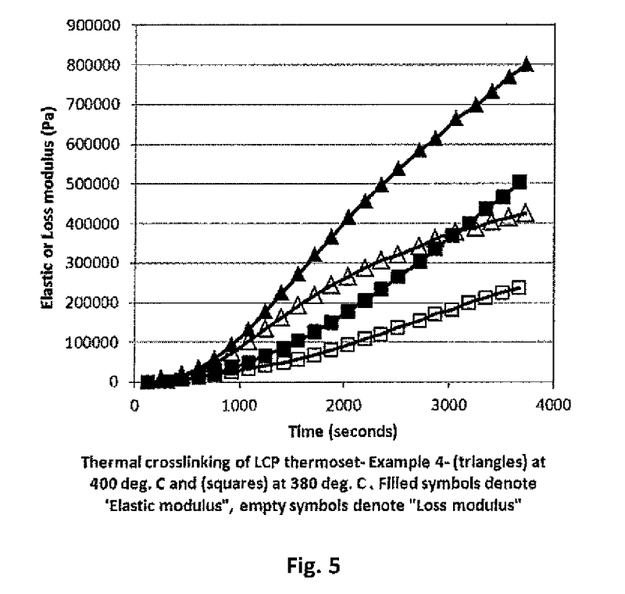
FIG. 5 is a graph showing elastic and loss modulus (Pa) versus time for Example 4 at temperatures of 380° C. and 400° C.

To estimate the degree of crosslinking in the polymer samples, the elastic modulus and complex viscosity are determined at temperatures of 380° C. and 400° C. for Examples 1, 2, and 4. The results are shown in FIGS. 1-5. As shown in FIGS. 1-2 and 5, for instance, the melt viscosity of the polymer samples of Examples 1, 2, and 4 (represented by the elastic modulus) rapidly increases at 400° C. in comparison to 380° C. Furthermore, as shown in FIG. 3, the complex viscosity increases faster for Example 1 (approximately 3% of Compound A) and Example 4 (approximately 3% of Compound D) in comparison to Example 2 (approximately 5% of Compound A). This can be attributed to a much lower initial melt viscosity (uncured) of Examples 2 and 4. FIG. 4 likewise illustrates the difference between Examples 1 and 4 and the Comparative Example, which has no active "crosslinkable" groups. The absence of rapid gelation in the Comparative Example can be seen by the gradual build-up of the moduli over time, which can be attributed to chain-extension rather than by active inter-chain crosslinking via the thermal reactions through the phenylethynyl functional groups.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A crosslinkable aromatic polyester formed by polymerizing aromatic ester precursor monomers in the presence of a biaromatic alkynyl crosslinking agent having the following general formula (I):

wherein,
ring A and B are independently a 6-membered aryl or heteroaryl optionally fused to a 6-membered aryl or heteroaryl;
$X_1$ is $Y_1R_1$;
$Y_1$ is O, C(O), OC(O), C(O)O, S, NR$_3$, C(O)NR$_3$, or NR$_3$C(O);
$R_1$ and $R_3$ are independently hydrogen, hydroxyl, alkyl, aryl, heteroaryl, cycloalkyl, or heterocyclyl;
$R_5$ and $R_6$ are independently alkynyl, alkyl, alkenyl, aryl, heteroaryl, cycloalkyl, heterocyclyl, halo, or haloalkyl;
a is 1;
m is from 0 to 4; and
n is from 0 to 5;
wherein the crosslinkable aromatic polyester has a melting temperature of from about 200° C. to about 370° C.

2. The crosslinkable aromatic polyester of claim 1, wherein m and n are equal to 0.

3. The crosslinkable aromatic polyester of claim 1, wherein $Y_1$ is O, OC(O), C(O)O, NH, C(O)NH, or NHC(O), and $R_1$ is H, OH, or alkyl.

4. The crosslinkable aromatic polyester of claim 3, wherein $Y_1R_1$ is OH, O-alkyl, OC(O)-alkyl, C(O)OH, C(O)O-alkyl, OC(O)OH, OC(O)O-alkyl, NH$_2$, NH-alkyl, C(O)NH$_2$, C(O)NH-alkyl, NHC(O)OH, NHC(O)O-alkyl, or a combination thereof.

5. The crosslinkable aromatic polyester of claim 1, wherein Rings A and B are phenyl.

6. The crosslinkable aromatic polyester of claim 5, wherein the biaromatic alkynyl crosslinking agent is 4-phenylethynyl benzoic acid; methyl 4-phenylethynyl benzoate; 4-phenylethynylphenyl acetate; 4-phenylethynyl benzamide; 4-phenylethynyl aniline; N-methyl-4-phenylethynyl aniline; 4-phenylethynyl phenyl carbamic acid; 4-phenylethynyl phenol; 3-phenylethynyl benzoic acid; 3-phenylethynyl aniline; 3-phenylethynylphenyl acetate; 3-phenylethynyl phenol; or a combination thereof.

7. The crosslinkable aromatic polyester of claim 5, wherein the biaromatic alkynyl crosslinking agent is 4-phenylethynyl benzoic acid; 4-phenylethynyl aniline; 4-(phenylethynyl) phenyl acetate; 4-phenylethynyl phenol; or a combination thereof.

8. The crosslinkable aromatic polyester of claim 1, wherein the polyester contains from about 25 mol. % to about 85 mol. % of aromatic hydroxycarboxylic repeating units of Formula III:

and from about 1 mol. % to about 40 mol. % of aromatic dicarboxylic acid repeating units of Formula IV:

wherein, ring X and Y are independently aryl.

9. The crosslinkable aromatic polyester of claim 8, wherein ring X and ring Y are 1,4-phenylene.

10. The crosslinkable aromatic polyester of claim 8, wherein the aromatic dicarboxylic acid repeating units include units derived from terephthalic acid, isophthalic acid, or a combination thereof.

11. The crosslinkable aromatic polyester of claim 8, wherein the aromatic hydroxycarboxylic acid repeating units include units derived from 4-hydroxybenzoic acid.

12. The crosslinkable aromatic polyester of claim 8, wherein the polyester further comprises one or more repeating units derived from an aromatic diol, aromatic amide, aromatic amine, or a combination thereof.

13. The crosslinkable aromatic polyester of claim 1, wherein the polyester is wholly aromatic.

14. The crosslinkable aromatic polyester of claim 1, wherein the total amount of repeating units in the aromatic polyester derived from naphthenic hydroxycarboxylic acids and/or naphthenic dicarboxylic acids is from 0% to about 10 mol. %.

15. The crosslinkable aromatic polyester of claim 1, wherein the polyester has a melt viscosity of about 150 Pa-s or less, determined at a shear rate of 1000 seconds$^{-1}$ and a temperature of 300° C.

16. The crosslinkable aromatic polyester of claim 1, wherein the precursor monomers are polymerized in the presence of multiple biaromatic alkynyl crosslinking agents.

17. The crosslinkable aromatic polyester of claim 16, wherein one of the biaromatic alkynyl crosslinking agents is a carboxylic acid and another of the biaromatic alkynyl crosslinking agents is a phenol, amine, amide, acetate, or a combination thereof.

18. The crosslinkable aromatic polyester of claim 1, wherein the precursor monomers are polymerized in the presence of a biaromatic alkynyl crosslinking agent and a monoaromatic alkynyl crosslinking agent.

19. A thermoset polymer formed by thermally crosslinking the aromatic polyester of claim 1.

20. A composite comprising a fibrous material and the thermoset polymer of claim 19.

21. The composite of claim 20, wherein crosslinkable polymer is impregnated within the fibrous material and thereafter crosslinked to form the thermoset polymer.

22. A method for forming an aromatic polyester, the method comprising melt polymerizing a reaction mixture comprising an aromatic hydroxycarboxylic acid precursor monomer, aromatic dicarboxylic acid precursor monomer, and biaromatic alkynyl crosslinking agent, wherein the biaromatic alkynyl crosslinking agent has the following general formula (I):

(I)

wherein, ring A and B are independently a 6-membered aryl or heteroaryl optionally fused to a 6-membered aryl or heteroaryl;

$X_1$ is $Y_1R_1$;

$Y_1$ is O, C(O), OC(O), C(O)O, S, $NR_3$, C(O)$NR_3$, or $NR_3$C(O);

$R_1$ and $R_3$ are independently hydrogen, hydroxyl, alkyl, aryl, heteroaryl, cycloalkyl, or heterocyclyl;

$R_5$ and $R_6$ are independently alkynyl, alkyl, alkenyl, aryl, heteroaryl, cycloalkyl, heterocyclyl, halo, or haloalkyl;

a is 1;

m is from 0 to 4; and n is from 0 to 5.

23. The method of claim 22, wherein the reaction mixture is melt polymerized at a temperature of from about 250° C. to about 350° C.

24. The method of claim 22, further comprising solid-state polymerizing the melt polymerized reaction mixture.

25. The method of claim 22, further comprising thermally crosslinking the melt polymerized reaction mixture.

26. The method of claim 25, wherein the thermal crosslinking is conducted at a temperature of about 380° C. or more.

27. The crosslinkable aromatic polyester of claim 1, wherein the crosslinkable aromatic polyester has a melting temperature of from about 250° C. to about 350° C.

28. A crosslinkable aromatic polyester formed by polymerizing aromatic ester precursor monomers in the presence of a biaromatic alkynyl crosslinking agent comprising 4-phenylethynyl benzoic acid; methyl 4-phenylethynyl benzoate; 4-phenylethynylphenyl acetate; 4-phenylethynyl benzamide; 4-phenylethynyl aniline; N-methyl-4-phenylethynyl aniline; 4-phenylethynyl phenyl carbamic acid; 4-phenylethynyl phenol; 3-phenylethynyl benzoic acid; 3-phenylethynyl aniline; 3-phenylethynylphenyl acetate; 3-phenylethynyl phenol; or a combination thereof.

\* \* \* \* \*

UNITED STATES PATENT AND TRADEMARK OFFICE
CERTIFICATE OF CORRECTION

PATENT NO. : 9,145,519 B2
APPLICATION NO. : 14/028570
DATED : September 29, 2015
INVENTOR(S) : Kamlesh P. Nair

Page 1 of 2

It is certified that error appears in the above-identified patent and that said Letters Patent is hereby corrected as shown below:

In the claims

Claim 1 (column 21)

"...general formula (I):

wherein,..." should read --...general formula (I):

wherein,...--

Claim 22 (column 23)

"...general formula (I):

Signed and Sealed this
Sixteenth Day of August, 2016

Michelle K. Lee
*Director of the United States Patent and Trademark Office* wherein,..." should read --...general formula (I):

wherein,...--